(12) United States Patent
Dowling et al.

(10) Patent No.: US 7,747,260 B2
(45) Date of Patent: Jun. 29, 2010

(54) MOBILITY VOICE MESSAGING

(75) Inventors: Daniel F. Dowling, Boynton Beach, FL (US); Faramarz F. Sahim, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 286 days.

(21) Appl. No.: 10/262,687

(22) Filed: Oct. 2, 2002

(65) Prior Publication Data
US 2004/0203935 A1 Oct. 14, 2004

(51) Int. Cl.
H04W 68/00 (2009.01)
H04M 1/725 (2006.01)
H04L 12/28 (2006.01)

(52) U.S. Cl. ............. 455/458; 455/412.1; 370/351
(58) Field of Classification Search ......... 455/414.4, 455/412.1, 414.1, 445, 90.1, 466, 567, 462, 455/413, 418, 412, 417; 379/88.04, 198, 379/201.01, 211.01, 211.02; 370/351; 709/227
See application file for complete search history.

(56) References Cited

U.S. PATENT DOCUMENTS

| | | | |
|---|---|---|---|
| 4,941,167 A * | 7/1990 | Cannalte et al. ......... 379/88.26 |
| 5,889,845 A * | 3/1999 | Staples et al. .......... 379/211.02 |
| 6,014,377 A * | 1/2000 | Gillespie .................... 370/351 |
| 6,041,103 A * | 3/2000 | La Porta et al. ............. 379/67.1 |
| 6,408,177 B1 * | 6/2002 | Parikh et al. ............. 455/414.4 |
| 6,577,859 B1 * | 6/2003 | Zahavi et al. ............. 455/412.1 |
| 6,792,095 B1 * | 9/2004 | Frank ..................... 379/216.01 |
| 6,799,034 B2 * | 9/2004 | Higuchi et al. ........... 455/414.4 |
| 6,823,184 B1 * | 11/2004 | Nelson ........................ 455/418 |
| 2002/0098831 A1 * | 7/2002 | Castell et al. ............... 455/413 |
| 2002/0142756 A1 * | 10/2002 | Rutledge et al. ........... 455/412 |
| 2002/0164974 A1 * | 11/2002 | Kwan et al. ................. 455/412 |
| 2002/0165969 A1 * | 11/2002 | Gallant ....................... 709/227 |
| 2003/0194994 A1 * | 10/2003 | Svedberg .................... 455/417 |
| 2004/0198461 A1 * | 10/2004 | Coombes .................... 455/567 |

FOREIGN PATENT DOCUMENTS

WO  WO 01/35616  5/2001

* cited by examiner

Primary Examiner—Charles N Appiah
Assistant Examiner—Kiet Doan

(57) ABSTRACT

A wireless communications device, network and method of wireless communications. The wireless device (e.g., a cell phone) allows users to respond to calls silently by selecting prompts. Each prompt is replaced with a recorded vocal response. The caller hears the recorded response.

16 Claims, 4 Drawing Sheets

MOBILITY VOICE MESSAGING

RELATED APPLICATION

The present application is related to U.S. patent application Ser. No. 09/710,037, entitled "Method and Apparatus for Extending PBX Features Via The Public Network" to Lindley et al., filed Nov. 8, 2000 and assigned to the assignee of the present invention.

BACKGROUND OF THE INVENTION

1. Field of the Invention

The present invention is related to wireless communications device messaging and more particularly, to silent messaging with wireless communication devices.

2. Background Description

Public wireless communications devices such as cellular or cell phones are commonplace. Cell phone ownership may soon be as commonplace as wristwatch ownership. Notoriously, when cell phones were first becoming popular, a mistimed cell phone ringing at an inopportune moment quickly became a common source of irritation, e.g., "someone's cell phone started ringing right in the middle of Hamlet's soliloquy!" Placing the phone in vibration mode solved this problem. However, even with a phone in vibration mode, answering the call can cause even greater consternation. As a result, cell phone etiquette is a common topic of discussion. A quick internet search identifies upwards of 1600 sites dealing with cell phones etiquette, www.cell-phone-etiquette.com.

Unfortunately, when someone receives a cell phone call at an inopportune time or an inopportune location, he/she must decide whether to answer the call or, let the call go unanswered, possibly to be answered by voice mail. If he/she decides to answer the call, there is a risk of interrupting or irritating everyone in the immediate vicinity. While to some, this clearly does not present a problem, taking a call in the middle of an important business meeting might jeopardize the call taker's career, standing with his/her employer or kill an important sale that had been a "done deal."

Skipping the call and trying to contact the caller at a better time and location can be equally troublesome. Some calls just can't be left to voicemail. After all, no one wants to retrieve a two hour old voice mail message that says "your mother's in the hospital. I'm calling from a pay phone and I'll call when I get a chance!" Such a message only begs questions with no immediate answers that could have and would been avoided with a few timely short questions. Often, even important calls can be handled quickly with just a few words. Even those calls that can't, often could be rescheduled more efficiently with short exchange of a few words.

Thus, there is a need for a discrete way to handle incoming cell phone calls without missing the calls and without disturbing others in the immediate vicinity.

SUMMARY OF THE INVENTION

It is a purpose of the invention to reduce disturbances by cell phone users;

It is another purpose of the invention to facilitate cell phone calls in close quarters and reduce disturbances to others in the vicinity of the calls;

It is yet another purpose of the invention to provide a way for cell phone users to take calls in public surroundings without disturbing others in the immediate vicinity.

The present invention relates to a wireless communications device, network and method of wireless communications. The wireless device (e.g., a cell phone) allows users to respond to calls silently by selecting prompts. Each prompt is replaced with a recorded vocal response. The caller hears the recorded response.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
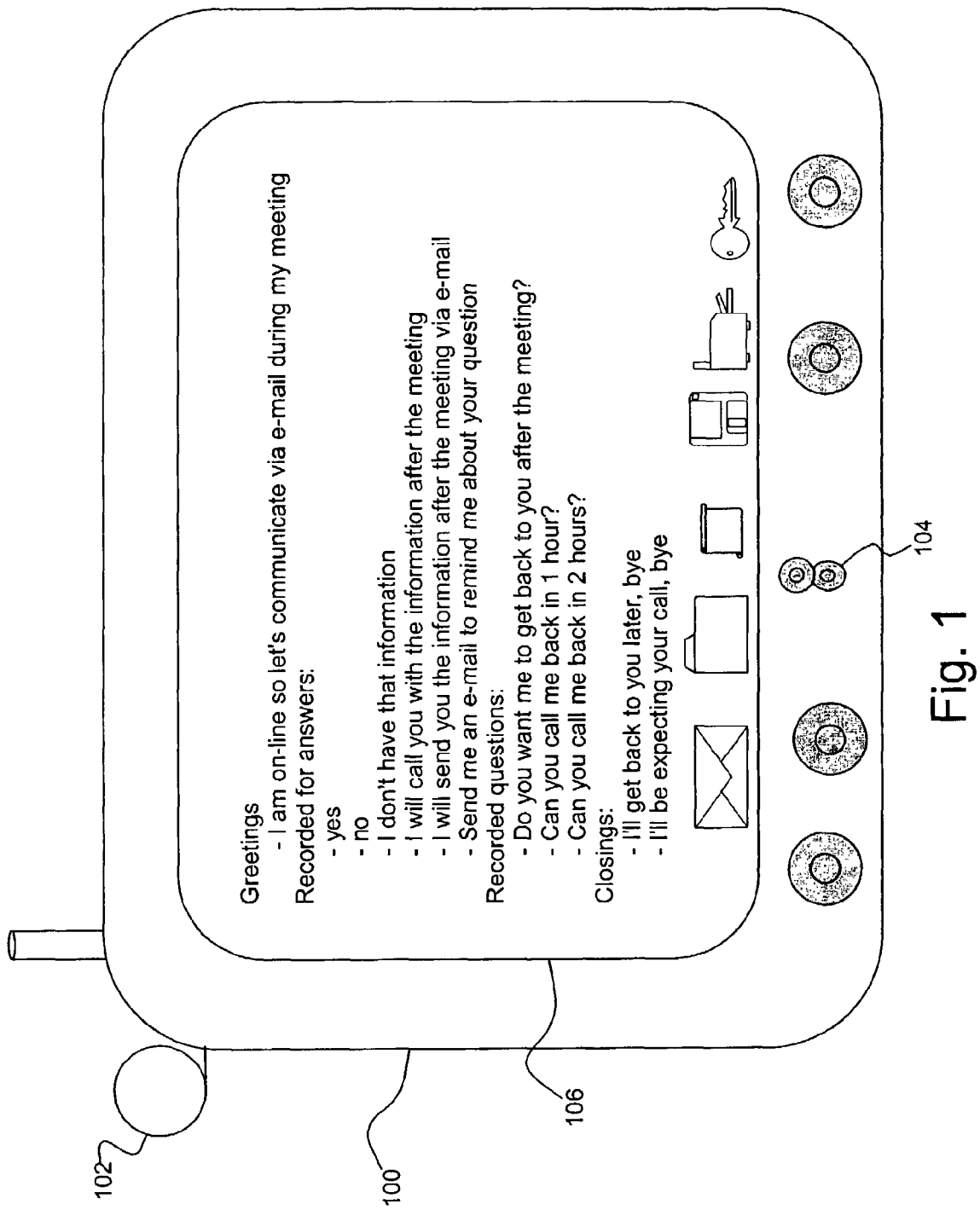
FIG. 1 shows an example of a wireless device for voice messaging according to a preferred embodiment of the present invention.

Turning now to the drawings and more particularly, FIG. 1 shows an example of a wireless device 100 for voice messaging according to a preferred embodiment of the present invention. Wireless device 100 may be as simple as a cell phone with a dial keypad for number entry, a more complex device such as a personal digital assistant (PDA) with cell phone capability or, as represented in this example, any other suitable device, e.g., a mobile or handheld computer with wireless voice communications capability. Thus, the wireless device 100 in this example is a wireless tablet with an earphone 102, microphone 104 and a touch sensitive input/output (I/O) screen 106.

Even while a meeting is in progress, for example, the user can silently answer incoming cell phone calls and communicate with the calling party without speaking. The user is alerted to an incoming phone call silently, e.g., with a vibration mode ringer (not shown) in the wireless device 100. Instead of speaking "hello," the user uses a stylus, finger or other instrument (not shown) to select and play a pre-recorded greeting to the caller. Optionally, the wireless device 100 may be set to send a pre-selected greeting automatically upon answering. In another example, a cell phone greeting could inform the calling party that the user is on the line and listening, but has only with limited response capability, e.g., with yes or no answers. Thus, prompting the caller to ask questions that elicit yes or no answers, the call may be completed without the user ever speaking a word. If the caller requires more complex answers than yes or no or more detailed information, the user and caller can easily schedule a more convenient time to call back, when the user can speak freely.

Figure 2:
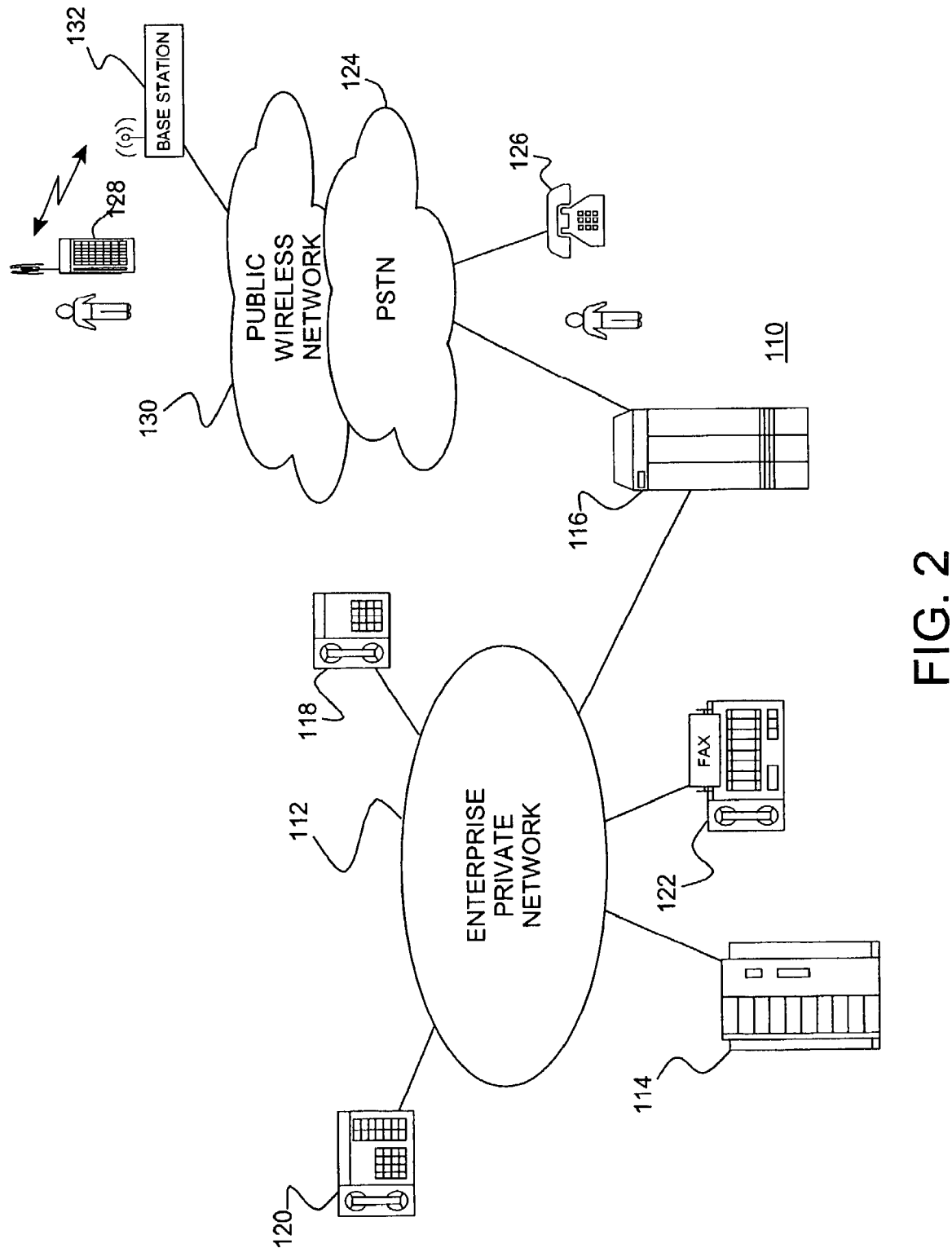
FIG. 2 shows an example of a second preferred embodiment mobility voice messaging system implemented in a private voice network.

FIG. 2 shows an example of a preferred embodiment mobility voice messaging system 110 implemented in a private voice network 112, extended for teleworking as described in "Method and Apparatus for Extending PBX Features Via The Public Network" to Lindley et al. (Lindley), U.S. patent application Ser. No. 09/710,037, filed Nov. 8, 2000 and assigned to the assignee of the present invention and incorporated herein by reference. The private voice network 112, which may be a voice over Internet protocol (VoIP) network, includes a teleworking server 114 connected to a communications network server 116, e.g., a private branch exchange (PBX). The communications network server 116 manages communications over the private voice network 112 and to digital communications devices at individual private network stations 118, 120, 122. The communications network server 116 is connected to a public switched telephone network (PSTN) 124 for external communication with other PSTN clients, e.g., 126. Also, communications network server 116 connects through PSTN 124 to one or more wireless devices 128, e.g., cell phones on public wireless network 130 through base station 132.

The teleworking server 114 manages communications for out of office or teleworking users, i.e., users that are connected to or that are connectable from the private voice network 112 over other than a normal private network station 118, 120, 122. Out of office users can avail themselves of all of the private network function through the teleworking server 114 including call redirection, e.g., to a personal cell phone 128. In addition, a preferred embodiment teleworking server 114 includes a non-verbal communication mode for cell phone usage, as well as previously stored user responses.

Each user can direct calls to his/her cell phone 128, either explicitly through call forwarding or, implicitly by listing the cell phone number in a "find me" list. When a call is forwarded to the cell phone 128, the user can invoke non-verbal communications mode, listen to incoming voice communications from the caller and respond by pressing keypad entries to provide a prerecorded verbal reply or response to the caller. Thus, with the cell phone in vibrate mode, the user can receive calls silently and carry on a complete, albeit limited, silent conversation.

For more sophisticated wireless devices, e.g., a PDA with cellular capability, any number of other actions are available to place the device in non-verbal communication mode input, e.g., selecting an object on a touch screen. Further, to differentiate between non-verbal communication mode inputs and other keypad entries, the teleworking server 114 may assign an access code that is recognized as a non-verbal communication mode input, e.g., ## from the cell phone followed by a number. When a call arrives, the user enters the access code to invoke non-verbal communication mode followed by selecting a prompt (e.g., a number) to select a verbal response, recorded in the user's own voice. In addition to the prompts in the screen 106 of FIG. 1, examples of other prompts and corresponding responses might include:

1. I can not talk right now but can hear you and answer simple questions.
2. One second I am in a place that I can not talk, I am stepping out to talk to you.
3. I am in a place that I can not talk but will call you back later OK?
4. I can not talk at the moment. So, I will forward you to Voice mail.
5 Could you repeat that again please?

Also, another key (e.g., *) may be designated to invoke the next level of prompts. For example, this next level of prompts may provide the same level of answers from a cell phone as from the wireless device of FIG. 1.

Figure 3A:
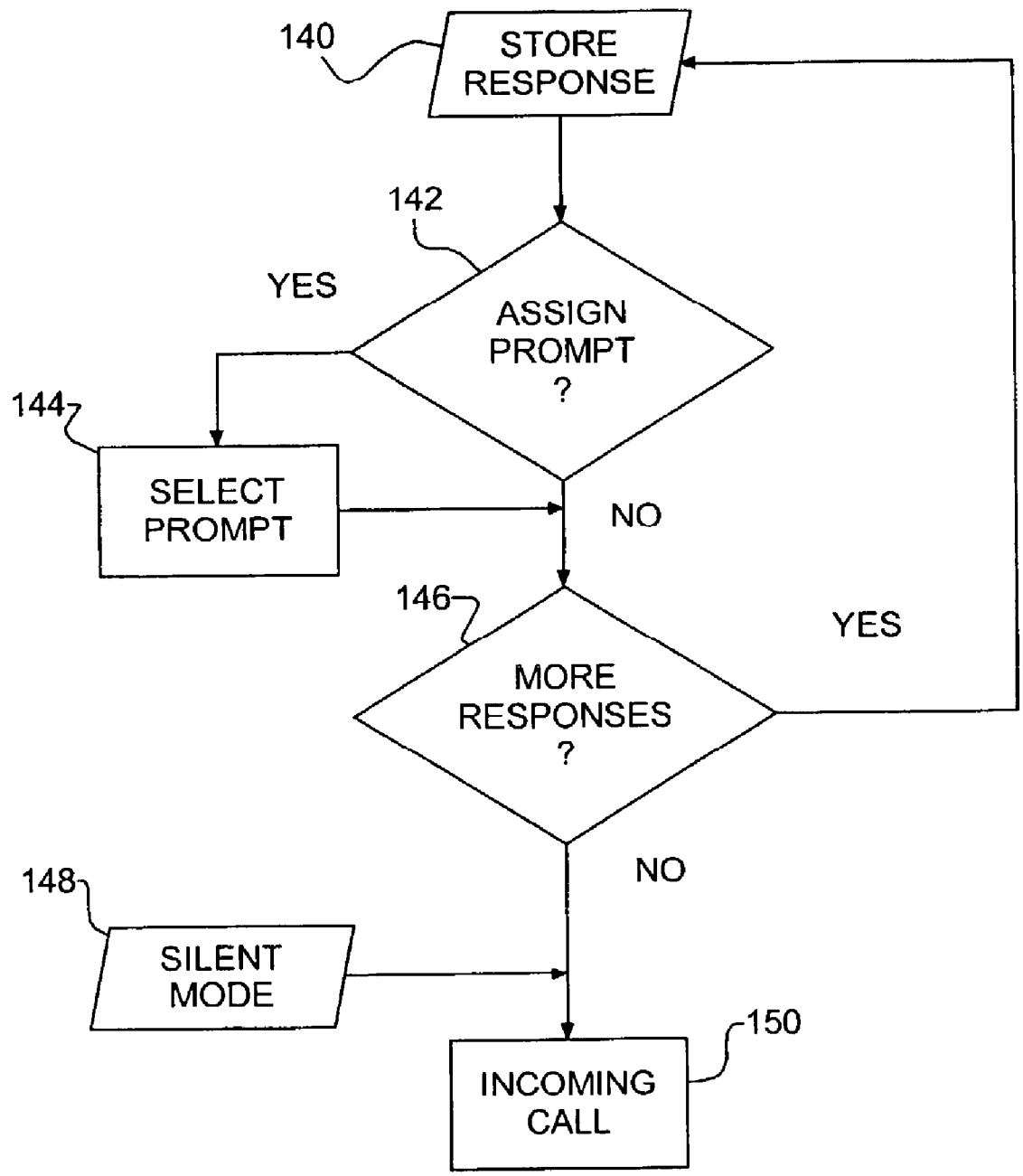
FIG. 3A shows an example of how a preferred embodiment device with mobility voice messaging may be used for silent/non-verbal communications.

FIG. 3A shows an example of how a preferred embodiment device with mobility voice messaging according to the present invention may be used for silent/non-verbal communications. Typically, at some point prior to embarking upon an appropriate situation, e.g., beginning a meeting, in step 140 the user records potential responses. The number and complexity of pre-recorded messages depends upon device or system capacity or, simply, by user friendliness, i.e., the point where the particular user has more messages than could ever possibly be remembered/used. Optionally, in step 142 the user may choose to assign a keypad prompt for each response in step 144 or may accept a default assignment. For a more complex wireless device, such as the wireless tablet 100 of FIG. 1 or a PDA, more complex prompts and responses, such as are shown in the example of FIG. 1, may be provided. After all of the prompts and responses have been entered in step 146, the device is ready for mobility voice messaging.

So, preferably, before the meeting or other appropriate situation, in step 148 the device ringer is placed in silent (vibrate) mode. Optionally, placing the device ringer in silent mode in step 148 may also invoke non-verbal communication mode. When in step 150 a call is received at the device, the user communicates as described hereinabove; listening to the incoming call and responding by selecting an appropriate response. The selected response is provided to the caller as any other spoken response.

Figure 3B:
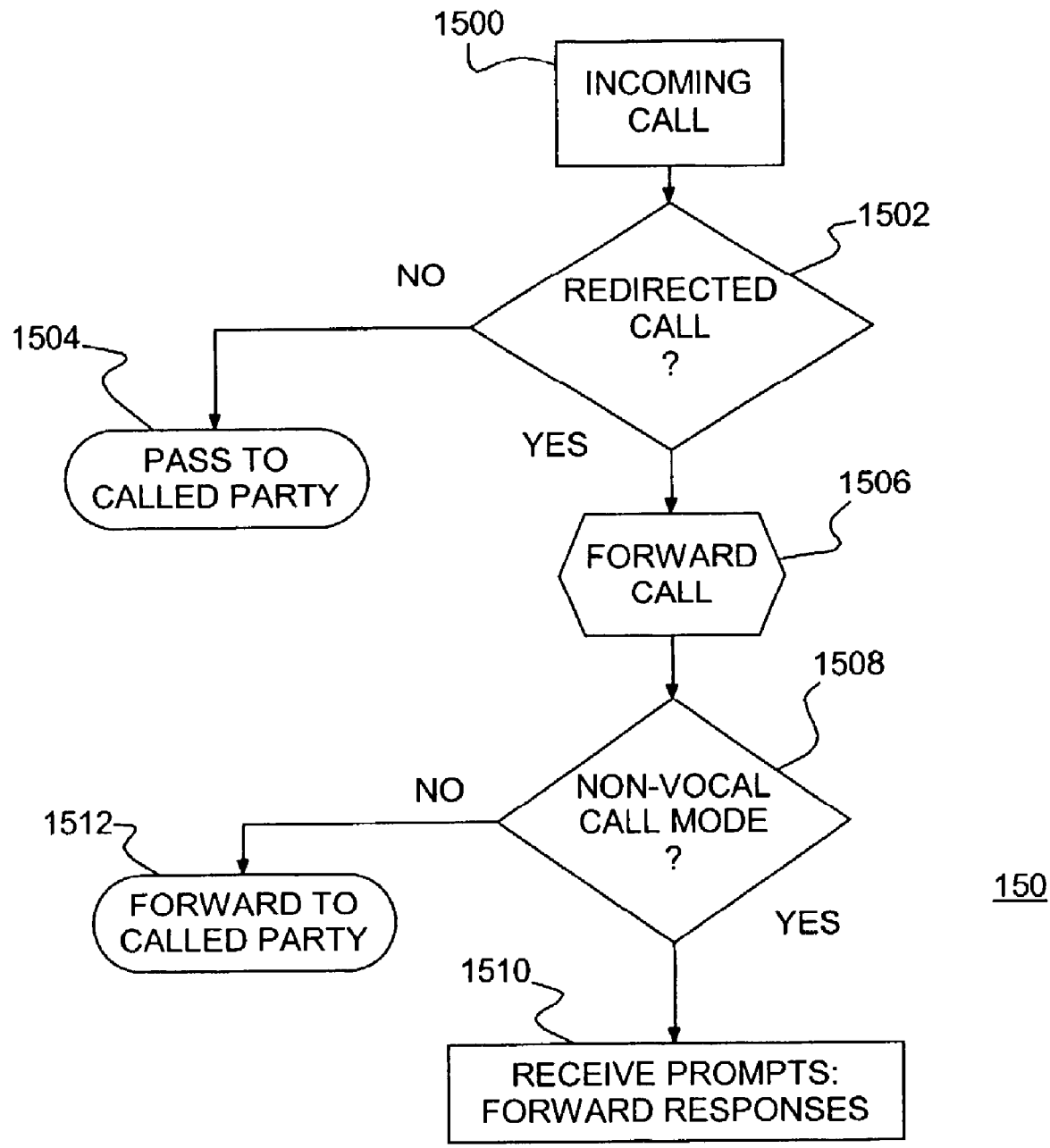
FIG. 3B shows in further detail an example of a silent/non-verbal call managed by a teleworking server.

FIG. 3B shows in further detail an example of how such an incoming call in step 150 may be managed with a teleworking server 114 with reference to the exemplary embodiment of FIG. 2. When a call is received in step 1500, e.g., from station 126, unless the call is redirected in step 1502 the communications server 116 forwards it to appropriate station 118, 120, 122 in step 1504. Otherwise, redirected calls are identified by the teleworking server and, in step 1506 forwarded to the previously identified wireless device 128. If the cell phone user has selected non-verbal mode in step 1508; then in step 1510, the teleworking server intercepts incoming non-verbal keypad prompts and substitutes verbal responses which are passed back to the caller at station 126. Otherwise, in step 1512 the teleworking server 114 directs the communications server 116 to pass the call to wireless station 128 as a normal teleworking call, e.g., such as is described in Lindley.

Thus, Mobility Voice Messaging according to the present invention provides a convenient non-intrusive way to communicate privately, even in a crowded room, without disturbing others, including those sitting or standing right next to the user. Even in the middle of a meeting, the user can handle calls and in many instances conclude calls non-verbally.

While the invention has been described in terms of preferred embodiments, those skilled in the art will recognize that the invention can be practiced with modification within the spirit and scope of the appended claims.

What is claimed is:

1. A wireless communications network comprising:
   a plurality of communications devices networked together over a private communications network, each of said plurality of communications devices being identified to at least one user;
   a communications server managing said private communications network;
   one or more wireless communications device connected to said private communications network through a public wireless network, each said one or more wireless communications device identified with one said at least one user; and
   a teleworking server storing one or more selectable levels of vocal responses for said each one or more wireless communications device, at least one device of said one or more wireless communications device having responses stored on a plurality of said levels, each level including a plurality of selectable vocal responses different than vocal responses on other levels of said plurality of levels, said teleworking server redirecting communications directed to respective ones of said plurality of communications devices identified with each said at least one user as being an out of office user, said teleworking server receiving non-verbal responses from each said one or more wireless communications device and selectively substituting stored said vocal responses in redirected said communications responsive to selected said non-verbal responses, substituted vocal responses being passed to calling devices at the other end of redirected calls, wherein said one or more wireless communications device includes at least one mobile computer with a set of responses selected responsive to displayable prompts, and a called party at a respective wireless communications device in silent mode selecting prompts communicates silently with connected callers calling said respective wireless communications device.

2. A wireless communications network as in claim 1 wherein said at least one device includes at least one cell phone with one keypad key selecting a next level and a plurality of other keypad keys being prompts selecting corresponding non-verbal responses on a current level, said at least one cell phone having a first number of responses as first level responses and selecting said next level provides responses corresponding to said set of responses for said mobile computer.

3. A wireless communications network as in claim 1 wherein said communications server is a private branch exchange (PBX) server, and vocal responses selectable on one level are unselectable when another level is selected.

4. A wireless communications network as in claim 1, wherein the teleworking server stores at least one find-me list for a corresponding station on said private voice network, calls to said station being redirected responsive to said find-me list.

5. A method of wireless communications, said method comprising the steps of:
   a) receiving calls directed to stations on a private network, at least one said station being identified to an out of office user, a wireless device being associated with each said out of office user;
   b) selecting silent mode on one said wireless device;
   c) selectively forwarding calls directed to each said at least one station to a corresponding said wireless device;
   d) receiving said redirected call at each said corresponding wireless device;
   e) selecting a prompt from a plurality of selectable prompts; and responsive to silent mode selection
   f) returning a corresponding non-verbal response from said one wireless device to said private network;
   g) retrieving a corresponding verbal response stored in a teleworking server; and
   h) replacing said non-verbal response with the retrieved said corresponding vocal response, replaced vocal responses being passed to devices at the other end of redirected calls, wherein said plurality of selectable prompts include one or more level selection prompt, non- verbal responses being organized in a plurality of selectable levels with a plurality of selectable non-verbal responses on each of said plurality of selectable levels and selecting each said level selection prompt selecting non-verbal responses on a corresponding level, wherein vocal responses retrieved for non-verbal responses from one level are unselectable and different than vocal responses retrieved when another level is selected, wherein said non-verbal responses are assigned to a corresponding said vocal response when each said vocal response is recorded, and a called party at a respective wireless device in silent mode selecting prompts communicates silently with connected callers calling said respective wireless device.

6. A method of wireless communications as in claim 5, wherein step (b) comprises placing said wireless device's ringer in vibrate mode, selecting vibrate mode invoking silent mode such that forwarded said calls receive returned said non-verbal responses.

7. A method of wireless communications as in claim 5, before the step (c) of selectively forwarding, said method further comprises:
   c1) determining whether each received call is redirected.

8. A method of wireless communications as in claim 7, wherein each of said stations receives calls whenever it is determined in step (c1) that calls are not redirected.

9. A method of wireless communications as in claim 5, wherein each said corresponding wireless device is listed in a find-me list for said station.

10. A method of wireless communications as in claim 5, before the step (b) of selecting silent mode said method further comprises the steps of:
   b1) recording a vocal response for an identified private network user;
   b2) storing the recorded response on said teleworking server;
   b3) assigning a non-verbal response to said recorded response; and
   b4) returning to step (b1) until all responses have been recorded for said identified private network user.

11. A communications system comprising:
   a plurality of private voice network stations;
   a communications server managing communications with said plurality of private voice network stations and selectively connecting to wireless communications devices identified as remote teleworking private network stations corresponding to one of said plurality of private voice network stations;
   each wireless communications device connected as an identified remote teleworking private network station comprising:
      means for entering silent mode for said each wireless communications device,
      means for receiving incoming wireless calls,
      means for listening to said incoming wireless calls, and
      means for selecting each of a plurality of prompts, each prompt corresponding to a non-verbal response, non-verbal responses being provided to said incoming wireless calls while in silent mode;
   at least one wireless communications device further including means for selecting a prompt level for each of said plurality of prompts, non-verbal responses being organized in a plurality of levels with a plurality of non-verbal responses on each of said plurality of levels, vocal responses retrieved for non-verbal responses from one level are unselectable and different than vocal responses retrieved when another level is selected; and
   a teleworking server managing communications with said remote teleworking private network stations and storing vocal responses for at least one of said corresponding plurality of private voice network stations, said communications server connecting to each of said wireless communications devices responsive to said teleworking server, wherein said teleworking server further comprises:
      means for selecting each of said stored spoken responses, and means for returning selected said spoken responses as said vocal responses, responsive to each non-verbal response from said each wireless communications device in silent mode, said teleworking server selectively substituting ones of stored said vocal responses for provided non-verbal responses received from silent mode wireless communications devices, said communications server returning substituted vocal responses to each caller calling said each at least one, substituted vocal responses being passed to calling devices at the other end of calls with said each wireless communications device, wherein a called party at a respective wireless communications device in silent mode selecting prompts communicates silently with connected callers calling said respective wireless communications device.

12. A communications system as in claim 11, wherein said communications server comprises:

means for connecting to a public wireless communications network.

13. A communications system as in claim 11, wherein at least one other wireless communications device is a mobile computer with a set of responses selected responsive to displayable prompts.

14. A communications system as in claim 13, wherein said at least one wireless communications device is a cell phone with a plurality of keys being prompts selecting corresponding non-verbal responses, and selecting vibrate mode invokes silent mode such that forwarded said calls receive said substituted vocal responses for returned said non-verbal responses, said at least one cell phone having a first number of responses as first level responses and selecting said next level provides responses corresponding to said set of responses for said mobile computer.

15. A communications system as in claim 11, wherein said at least one wireless communications device is a cell phone with at least one keypad key being a prompt that selects a next level of stored said vocal responses, a plurality of other keypad keys being prompts selecting corresponding non-verbal responses on a current level, and each stored level of said vocal responses including a plurality of selectable said vocal responses.

16. A communications system as in claim 11, wherein the teleworking server includes at least one find-me list for a corresponding station on said private voice network, calls being forwarded to said wireless communications device responsive to said find-me list.

* * * * *